March 31, 1931. F. G. HEHR 1,798,260
OIL ENGINE
Filed Feb. 1, 1929
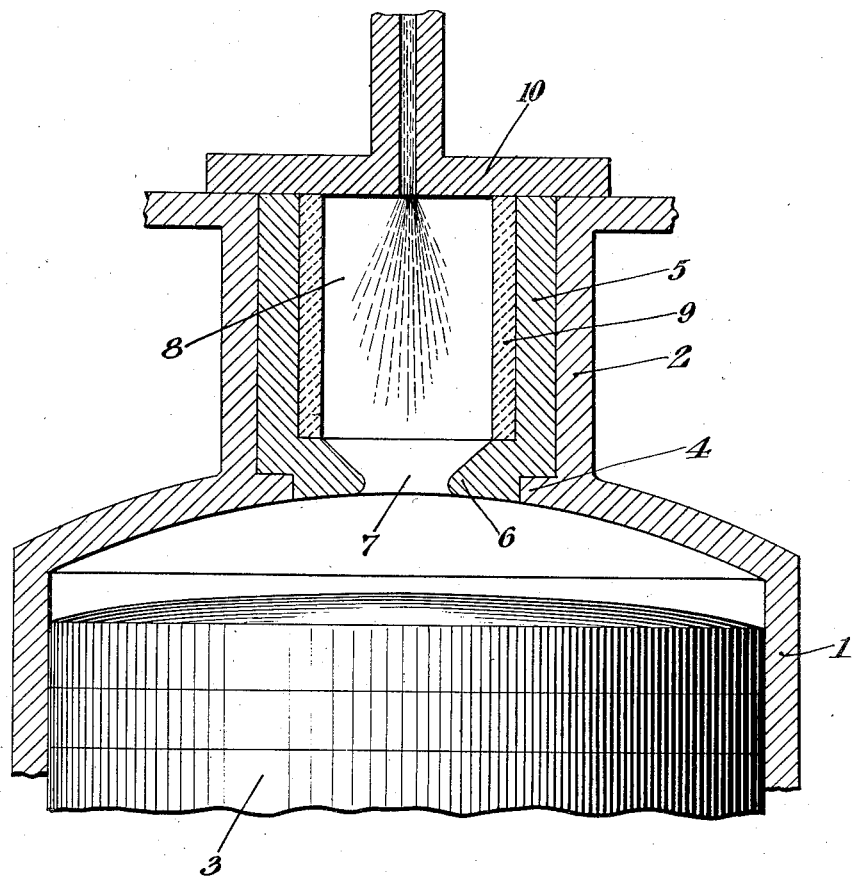
INVENTOR
*Frederick G. Hehr*
BY
*Townsend + Decker*
ATTORNEYS Patented Mar. 31, 1931

1,798,260

UNITED STATES PATENT OFFICE

FREDERICK G. HEHR, OF NEW YORK, N. Y., ASSIGNOR, BY DIRECT AND MESNE ASSIGNMENTS, TO AEROL ENGINE CORPORATION, OF NEW YORK, N. Y., A CORPORATION OF NEW YORK

OIL ENGINE

Application filed February 1, 1929. Serial No. 336,787.

This invention relates to oil-burning engines preferably of the Diesel type and more particularly to the construction of combustion chamber in which the fuel is burned to produce movement of the piston.

The principal object of the invention is the production of a combustion chamber so constructed as to retain a maximum of heat to thereby insure a perfect and efficient combustion of the fuel when it is injected therein.

Other and further objects and advantages of the invention will appear from the following description taken in connection with the accompanying drawing in which the figure is a horizontal section taken through the combustion chamber and engine cylinder.

Referring in detail to the drawing:

1 indicates the wall of the engine cylinder which is provided with an upwardly extending wall or flange 2, said cylinder wall and flange being preferably subjected to a cooling medium such as air or water. 3 indicates the piston which may be of any conventional type and which is adapted to reciprocate in the cylinder 1.

Lying in close engagement with the flange 2 and seated on a suitable shoulder 4 is a sleeve 5 formed of a material having a very high coefficient of heat conductivity. Said sleeve 5 is provided at its lower end with a downwardly and inwardly extending projection forming a nozzle having an opening 7.

The combustion chamber is indicated at 8. This chamber is provided with an inner lining comprising a sleeve 9 in close contact with the sleeve 5 and formed of a heat-resisting material having a very low coefficient of heat transmission. Forming the upper wall of the chamber 8 is an injector 10 through which fuel is injected at predetermined timed intervals into the combustion chamber 8 where it strikes the nozzle 6 and is broken into fine particles which are burned by the heat of the chamber, the expanded gases then being forced through the opening 7 into the cylinder to force the piston downwardly as ordinarily.

Inasmuch as the sleeve 9 is composed of a heat resisting material of a low coefficient of heat transmission it acts to retard the flow of heat from the combustion chamber to the cooling medium and also acts to transmit part of the retained heat of the previous charge to the new charge thus raising the temperature of the new cycle and making for a very high thermal efficiency.

In many previous cases trouble has been experienced by the burning away of the nozzle 6 due to the intense heat in the combustion chamber. This has been overcome by means of the present invention, however, as the nozzle is a part of the sleeve 5 formed of a material having a high coefficient of heat conductivity. Consequently the surplus heat in the nozzle is rapidly dissipated through the sleeve 5 and through the cooled wall 2 into the cooling medium.

What I claim as my invention is:

1. In an oil engine, a cylinder and a combustion chamber associated therewith and having an outer wall exposed to a cooling medium, an intermediate wall formed of a material having a high coefficient of heat conductivity and an inner wall formed of a heat resisting material having a low coefficient of heat transmission.

2. In an oil engine, a cylinder, a combustion chamber associated therewith and comprising an outer wall, an intermediate wall formed of a material having a high coefficient of heat conductivity and an inner wall formed of a heat resisting material having a low coefficient of heat transmission and a nozzle forming a part of said intermediate wall and provided with an opening communicating with said cylinder.

3. In an oil engine, a cylinder provided with an upwardly extending flange, a sleeve in close contact with said flange and formed of a material having a high coefficient of heat conductivity, a combustion chamber having a sleeve in contact with said first-named sleeve and formed of a heat resisting material having a low coefficient of heat transmission and an inwardly extending nozzle provided with an opening communicating with said cylinder and forming the lower wall of said combustion chamber, said nozzle being integral with said first-named sleeve.

4. In an oil engine, a cylinder, a combustion chamber associated therewith and comprising an outer wall exposed to a cooling medium, an intermediate wall formed of a material having a high coefficient of heat conductivity and an inner wall formed of a heat resisting material having a low coefficient of heat transmission, an oil injector forming the top wall of said combustion chamber and an inwardly extending nozzle integral with said intermediate wall and forming the lower wall of said combustion chamber.

Signed at New York in the county of New York and State of New York this 31st day of January, A. D. 1929.

FREDERICK G. HEHR.